(12) United States Patent
Li et al.

(10) Patent No.: US 11,709,058 B2
(45) Date of Patent: Jul. 25, 2023

(54) PATH PLANNING METHOD AND DEVICE AND MOBILE DEVICE

(71) Applicant: GOERTEK INC., Weifang (CN)

(72) Inventors: Baoming Li, Weifang (CN); Libing Zou, Weifang (CN); Tianrong Dai, Weifang (CN)

(73) Assignee: GOERTEK INC., Weifang (CN)

( * ) Notice: Subject to any disclaimer, the term of this patent is extended or adjusted under 35 U.S.C. 154(b) by 523 days.

(21) Appl. No.: 16/625,193

(22) PCT Filed: Jan. 8, 2019

(86) PCT No.: PCT/CN2019/098779
§ 371 (c)(1),
(2) Date: Dec. 20, 2019

(87) PCT Pub. No.: WO2020/134082
PCT Pub. Date: Jul. 2, 2020

(65) Prior Publication Data
US 2021/0333108 A1     Oct. 28, 2021

(30) Foreign Application Priority Data
Dec. 28, 2018 (CN) .......................... 201811628415.8

(51) Int. Cl.
*G01C 21/20*     (2006.01)
*G06T 7/11*     (2017.01)
(Continued)

(52) U.S. Cl.
CPC .......... *G01C 21/20* (2013.01); *G01C 21/3807* (2020.08); *G01S 17/89* (2013.01);
(Continued)

(58) Field of Classification Search
CPC ...... G01C 21/00; G01C 21/005; G01C 21/20; G01C 21/206; G01C 21/38;
(Continued)

(56) References Cited

U.S. PATENT DOCUMENTS

2006/0041375 A1    2/2006   Witmer et al.
2018/0075643 A1*   3/2018   Sequeira .............. G05D 1/0272

FOREIGN PATENT DOCUMENTS

| CN | 101261136 A | 9/2008 |
| CN | 101619985 | 1/2010 |

(Continued)

OTHER PUBLICATIONS

Kummerle R, Autonomous Driving in a Multi-level Parking Structure (Year: 2009).*

(Continued)

*Primary Examiner* — Charles J Han
(74) *Attorney, Agent, or Firm* — LKGlobal | Lorenz & Kopf, LLP

(57) ABSTRACT

The present disclosure discloses a path planning method and device and a mobile device. The method comprises: collecting environmental information in a viewing angle by a sensor of a mobile device, processing the environmental information by using an SLAM algorithm, and constructing a grid map; dividing the grid map to obtain a plurality of pixel blocks, using an area constituted of pixel blocks not occupied by obstacles as a search area for path planning, and obtaining a processed grid map; determining reference points by using pixel points in the search area, and deploying topological points on the processed grid map according to the reference point determined and constructing a topological map; and calculating an optimal path from a starting point to a preset target point by using a predetermined algorithm according to the topological map constructed. The (Continued)

present disclosure improves path planning efficiency and saves storage resources.

10 Claims, 4 Drawing Sheets

(51) Int. Cl.
  *G06T 7/13* (2017.01)
  *G01C 21/00* (2006.01)
  *G01S 17/89* (2020.01)
  *G01S 17/93* (2020.01)
(52) U.S. Cl.
  CPC ............... *G01S 17/93* (2013.01); *G06T 7/11* (2017.01); *G06T 7/13* (2017.01); *G06T 2207/20164* (2013.01)
(58) Field of Classification Search
  CPC . G01C 21/3804; G01C 21/3807; G01S 17/00; G01S 17/006; G01S 17/02; G01S 17/06; G01S 17/29; G01S 17/42; G01S 17/88; G01S 17/89; G01S 17/93; G01S 17/931; G01S 7/00; G01S 7/48; G01S 7/4808; G06Q 10/00; G06Q 10/04; G06Q 10/047; G06T 2207/00; G06T 2207/20; G06T 2207/20112; G06T 2207/20164; G06T 7/00; G06T 7/10; G06T 7/11; G06T 7/13; G06T 7/50; G06T 7/55; G06T 7/579
  See application file for complete search history.

(56) References Cited

FOREIGN PATENT DOCUMENTS

| CN | 103278170 |   | 9/2013 |
|----|-----------|---|--------|
| CN | 104898660 | A | 9/2015 |
| CN | 105953785 |   | 9/2016 |
| CN | 107817802 | A | 3/2018 |
| CN | 108765326 |   | 11/2018 |
| CN | 108898605 | A | 11/2018 |
| CN | 109541634 |   | 3/2019 |
| JP | 2009053849 | A | 3/2009 |
| JP | 2010092147 | A | 4/2010 |

OTHER PUBLICATIONS

PCT/CN2019/098779, International Search Report and Written Opinion, dated Oct. 28, 2019, 11 pages.
Search Report and Written Opinion in Chinese Application No. 201811628415.8, Application dated Aug. 23, 2022 and English translation of Search Report (10 pages).

\* cited by examiner

PATH PLANNING METHOD AND DEVICE AND MOBILE DEVICE

CROSS REFERENCE TO RELATED APPLICATIONS

This application is a U.S. National Stage entry under 35 U.S.C. § 371 based on International Application No. PCT/CN2019/098779, filed on Aug. 1, 2019, which claims priority to Chinese Patent Application No. 201811628415.8, filed on Dec. 28, 2018. The embodiment of the priority applications are hereby incorporated herein in their entirety by reference.

TECHNICAL FIELD

The present disclosure relates to the technical field of simultaneous localization and mapping (SLAM), and particularly relates to a path planning method and device based on simultaneous localization and mapping, and a mobile device.

BACKGROUND

In recent years, fields such as smart robots, drones, unmanned vehicles and virtual reality have become increasingly hot, and the SLAM has become well known and been considered as one of the key technologies in these fields. In SLAM, a robot starts out from an unknown position in an unknown environment, locates its own position and attitude in the moving process by map features (such as corners and pillars) repeatedly observed, and then incrementally constructs a map based on its positions, thereby achieving simultaneous localization and mapping.

Depending on the sensor used, there are three kinds of solutions: SLAM based on RGB-D camera, SLAM based on vision and SLAM based on laser sensor. Laser-based SLAM is a relatively mature positioning and navigation solution. Currently, laser-based SLAM mostly uses filter algorithm, probability algorithm, least squares method, graph optimization, etc., such as commonly used GMapping, Hector SLAM, and Karto SLAM algorithms. Whichever algorithm is used, a grid map must be generated; namely, the entire environment must be divided into several grids of the same size. Although the grid map is easy to construct, the resolution of the grid map is not dependent on the complexity of the environment, resulting in problems such as low path planning efficiency and space waste.

SUMMARY

The present disclosure provides a path planning method and device based on simultaneous localization and mapping and a mobile device, which improves path planning efficiency and saves storage resources.

According to an aspect of the present disclosure, a path planning method based on simultaneous localization and mapping is provided, and the method comprises:

collecting environmental information within a viewing angle by a sensor of a mobile device, processing the environmental information by using an SLAM algorithm, and constructing a grid map;

dividing the grid map to obtain a plurality of pixel blocks, using an area constituted of pixel blocks not occupied by obstacles as a search area for path planning, and obtaining a processed grid map;

determining reference points by using pixel points in the search area, deploying topological points on the processed grid map according to the reference points determined, and constructing a topological map; and calculating an optimal path from a starting point to a preset target point by using a predetermined algorithm according to the topological map constructed.

According to another aspect of the present disclosure, a path planning device based on simultaneous localization and mapping is provided, and the device comprises:

a grid map construction unit, for collecting environmental information within a viewing angle by a sensor of a mobile device, processing the environmental information by using an SLAM algorithm, and constructing a grid map;

a grid map processing unit, for dividing the grid map to obtain a plurality of pixel blocks, using an area constituted of pixel blocks not occupied by obstacles as a search area for path planning, and obtaining a processed grid map;

a topographic map construction unit, for determining reference points by using pixel points in the search area, deploying topological points on the processed grid map according to the reference points determined, and constructing a topological map; and a path planning unit, for calculating an optimal path from a starting point to a preset target point by using a predetermined algorithm according to the topological map constructed.

According to still another aspect of the present disclosure, a mobile device is provided, and the mobile device comprises: a memory and a processor, wherein the memory and the processor are communicatively connected by an internal bus, the memory stores program instructions executable by the processor which enable to implement the path planning method based on simultaneous localization and mapping according to an aspect of the present disclosure when executed by the processor.

The path planning method and device based on simultaneous localization and mapping according to the present disclosure divides the constructed grid map to obtain pixel blocks, determines a search area for path planning based on pixel blocks not occupied by obstacles, determines reference points by using pixel points in the search area, deploys topological points on the processed grid map according to the reference points determined and constructs a topological map constructing a topological map, and finally calculates an optimal path from the starting point to the preset target point according to the topological map constructed. Compared with path planning solutions based on pixel points in the prior art, the present disclosure determines the search area based on the pixel blocks unoccupied, and calculates and plans the optimal path according to the search area, thereby greatly reducing the map resolution, improving path planning efficiency and saving storage space. The mobile device according to the present disclosure has a high path planning efficiency, and avoids the problem of space waste.

DETAILED DESCRIPTION

In order to make the objects, technical features and advantages of the present disclosure clearer, the present disclosure will be further described in detail with reference to the accompanying drawings and specific embodiments. Apparently, the embodiments described are merely some but not all of embodiments of the present disclosure. All other embodiments obtained by those skilled in the art based on the embodiments of the present disclosure without paying any creative efforts shall fall within the protection scope of the present disclosure.

The design concept of the present disclosure is as follows. With respect to the problems of low planning efficiency and space waste in path planning in the prior art, a path planning solution based on simultaneous localization and mapping is proposed, which improves path planning efficiency and optimizes storage resources by division of grids based on pixel blocks, map optimization based on topological points and shortest path calculation based on the topological map.

Figure 1:
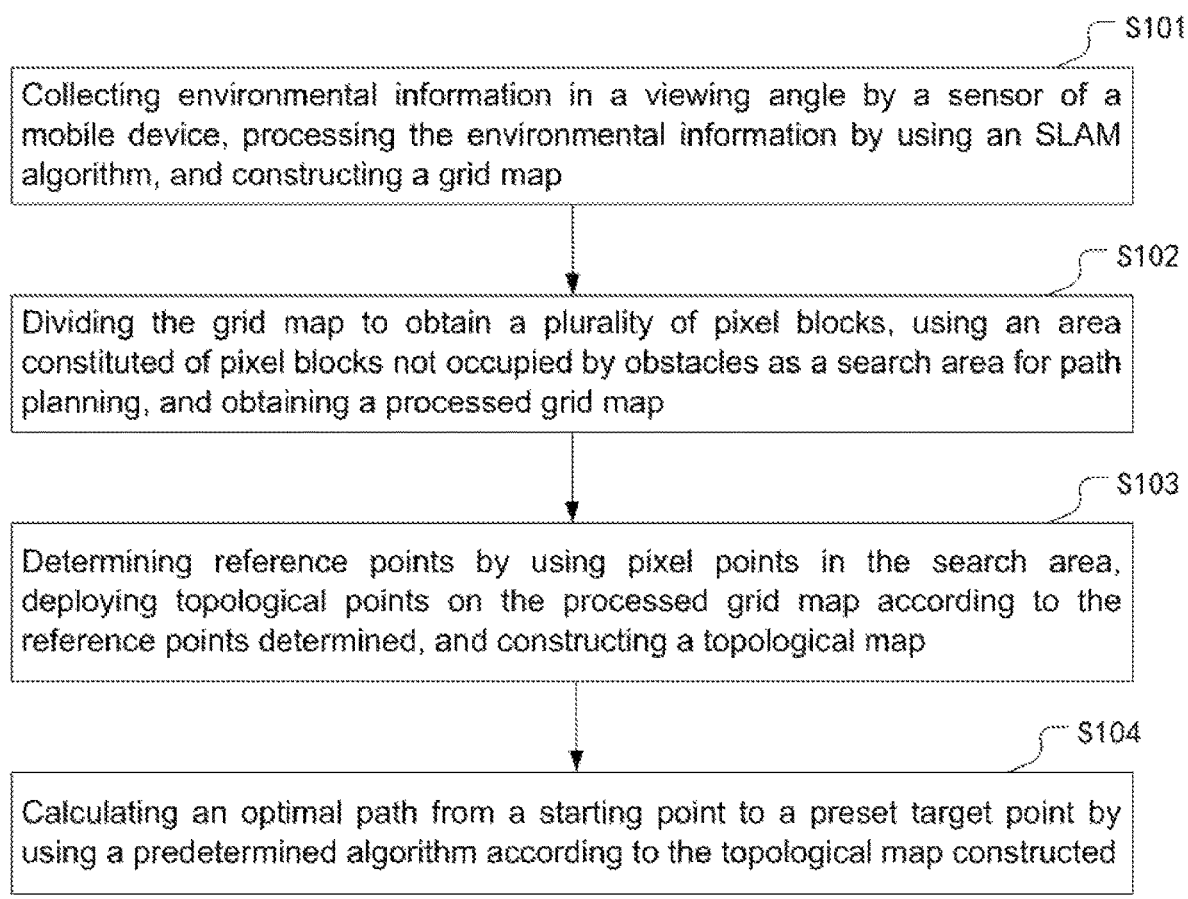
FIG. 1 is a schematic flow chart of a path planning method based on simultaneous localization and mapping according to an embodiment of the present disclosure.

FIG. 1 is a schematic flowchart of a path planning method based on simultaneous localization and mapping according to an embodiment of the present disclosure. Referring to FIG. 1, the path planning method based on simultaneous localization and mapping in the present embodiment comprises the following steps:

Step S101, collecting environmental information within a viewing angle by a sensor of a mobile device, processing the environmental information by using an SLAM (Simultaneous Localization and Mapping) algorithm, and constructing a grid map;

Step S102, dividing the grid map to obtain a plurality of pixel blocks, using an area constituted of pixel blocks not occupied by obstacles as a search area for path planning, and obtaining a processed grid map;

Step S103, determining reference points by using pixel points in the search area, deploying topological points on the processed grid map according to the reference points determined, and constructing a topological map; and Step S104, calculating an optimal path from a starting point to a preset target point by using a predetermined algorithm according to the topological map constructed.

It can be seen from FIG. 1, the path planning method of the present embodiment divides the constructed grid map to obtain pixel blocks, determines a search area for path planning based on pixel blocks not occupied by obstacles, determines reference points by using pixel points in the search area, deploys topological points on the processed grid map according to the determined reference points and constructs a topological map, and finally calculates an optimal path according to the topological map constructed. Compared with the prior art, the map is divided into grids according to pixel blocks, and it does not need to search with respect to every pixel, which can improve map path planning efficiency while ensuring the planning effect, and save storage resources as well.

In an embodiment, Step S104 comprises:

calculating a shortest distance between any two topological points by using a predetermined algorithm, determining adjacency information of any two topological points, storing the shortest distance information between any two topological points in a linked list;

calculating a shortest distance between the starting point and a topological point nearest to the starting point as a first distance;

calculating a shortest distance between the target point and a topological point nearest to the target point as a second distance;

looking up the linked list to obtain a shortest distance between the topological point nearest to the starting point and the topological point nearest to the target point as a third distance, and obtaining an optimal path from the starting point to the target point by summing the first distance, the second distance, and the third distance.

It can be seen that the calculation of optimal path can be determined by three distances which are all related to topological points, which significantly improves path planning efficiency.

The implementation steps of the path planning method based on simultaneous localization and mapping in the present disclosure will be described below in conjunction with a specific application scenario.

Figure 2:
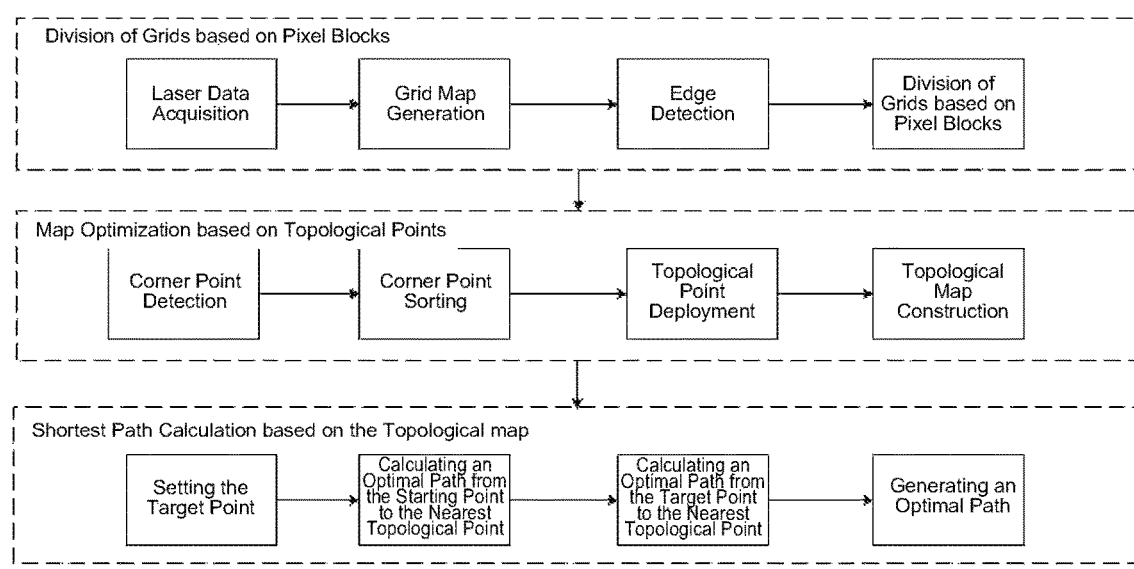
FIG. 2 is a flow chart of a path planning method based on simultaneous localization and mapping according to another embodiment of the present disclosure.

Referring to FIG. 2, generally speaking, the path planning method based on simultaneous localization and mapping of the present embodiment comprises three major steps: step 1, division of grids based on pixel blocks; step 2, map optimization based on topological points; and step 3, shortest path calculation based on the topological map. The three major steps will be specifically described one by one as follows.

Step 1: Division of Grids Based on Pixel Blocks

Referring to FIG. 2, this step comprises four sub-steps: laser data acquisition, grid map generation, edge detection, and division of grids based on pixel blocks. Specifically, Laser Data Acquisition.

In the present embodiment, environmental information within a viewing angle collected by a sensor of a mobile device is acquired. Laser sensors, or laser radars (LiDAR), include mechanical laser radars and solid state laser radars. Mechanical laser radars control the laser emission angle through rotating components and collect environmental information in different viewing angles.

Grid Map Generation.

Figure 3:
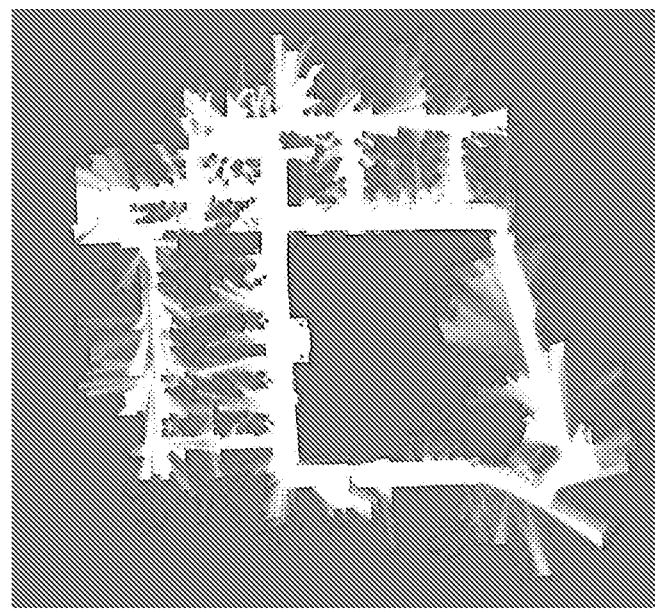
FIG. 3 is a schematic diagram of a grid map according to an embodiment of the present disclosure.

The SLAM algorithm is used to generate grid map. The SLAM algorithm collects a series of scattered point clouds including angle information and distance information using a laser radar, calculates distance and angle changes of the relative motion of the laser radar by matching and contrasting two point clouds at different moments, thereby completing the grid map construction. FIG. 3 is an illustration of the grid map constructed based on the environmental information collected by the laser sensor according to the present embodiment. A grid map can be understood as a matrix, and a value in the matrix represents the probability that the position is occupied by an obstacle. As shown in FIG. 3, in general, a pure black dot (i.e., the gray value is 0) has a probability of 1 and represents being occupied; a gray dot (the gray value is 127) has a probability of 0.5 and represents unknown; a pure white dot (the gray value is 255) has a probability of 0 and represents not occupied. In other words, the color of each grid in the grid map represents the probability that this grid is occupied. The darker the color is, the higher the occupancy rate is (namely, more likely to be an obstacle or a building). The reason of using probability is that the construction of grid map is dependent on the navigation system, and the navigation system is error-prone no matter how accurate it is, so the constructed grid map based on these position information is not necessarily accurate.

Edge Detection.

In order to accurately extract the feasible domain of the map, the edge detection of the grid map is performed in the present embodiment. Before performing the edge detection, the grid map is binarized, and the position corresponding to the pixel point in the grid map with the occupied probability within 0.4 to 1 is determined to be occupied by an obstacle, otherwise it is determined to be idle. In the present embodiment, the Canny edge detection algorithm is used to perform edge detection on the grid map. Its main flow comprises the following order of steps: Gaussian filtering and smoothing the image→calculating the amplitude and direction of the image gradient→non-maximum value suppression→dual-threshold for edge detection and connection→image erosion and dilation It should be noted that the Canny edge detection algorithm belongs to the prior art, so the implementation details of the edge detection may refer to the description in the prior art and will not be repeated herein. In addition, the edge detection algorithm and its specific implementation manners are not limited in the present disclosure. In some embodiments, the edge detection step may be omitted.

Division of Grids based on Pixel Blocks.

In the present embodiment, dividing the grid map to obtain a plurality of pixel blocks, and using an area constituted of pixel blocks not occupied by obstacles as a search area for path planning comprises: dividing the grid map to obtain a plurality of pixel blocks by using multiple block areas equal in area; and judging whether a pixel block is occupied by an obstacle, if yes, setting a gray value of pixel points in the pixel block to a first value, and if not, setting a gray value of pixel points in the pixel block to a second value. As an implementation manner, judging whether a pixel block is occupied by an obstacle comprises: judging, for each pixel block, whether a central pixel point of the pixel block is occupied by an obstacle; if the central pixel point is occupied, determining that the pixel block is occupied by an obstacle, and judging next pixel block until all the pixel blocks are traversed; and if the central pixel point is not occupied by an obstacle, sequentially traversing other pixel points in the pixel block, and if none of other pixel points is occupied by an obstacle, determining that the pixel block is not occupied by an obstacle.

For example, the map is divided using a block area from top to bottom and from left to right. For example, every 6*6 pixels (i.e., the area of the block area is 6*6) is a grid. When the grid map is divided by the block area, when the area to be divided on the grid map has an area less than the area of the block area, the insufficient part is filled with a first value (such as 0) to obtain a divided block area. In other words, when the area is not enough for a grid, the insufficient part (usually at the edge of the map) is filled with 0.

Figure 4:
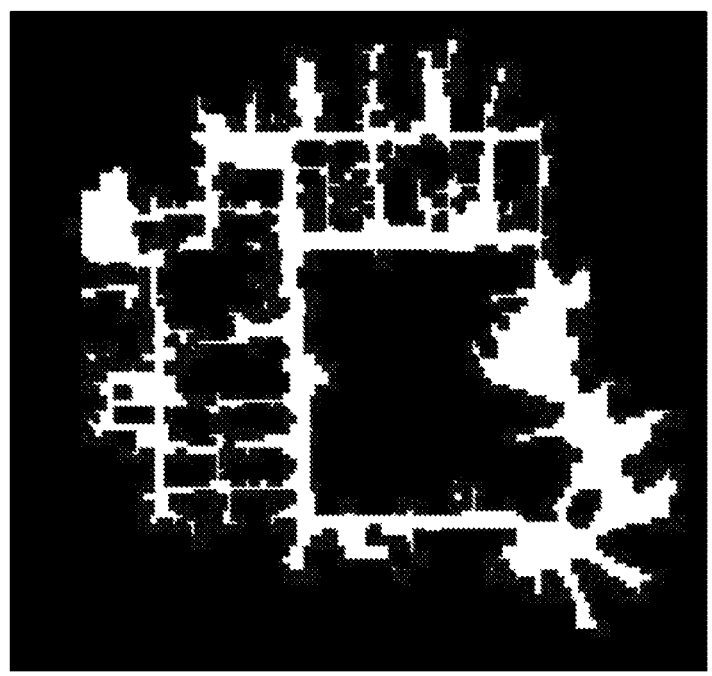
FIG. 4 is a schematic diagram of a processed grid map according to an embodiment of the present disclosure.

After dividing into pixel blocks, all pixel blocks in the divided map are traversed to judge whether a pixel point in the center of the grid (i.e., the center of the pixel block) is occupied. If the central pixel point is occupied, it is determined that the pixel block being judged has been occupied, and the judgment is performed continually on the next pixel block until all the pixel blocks are traversed; if the central pixel point is not occupied, all pixel points surrounding the central pixel point in the pixel block are sequentially traversed (for example, for a 3*3 pixel block, the remaining 8 pixel points except the central pixel point are sequentially traversed), and if none of the surrounding pixel points is occupied, it is determined that the pixel block is feasible (i.e., the pixel block is idle, and can be used to determine a search area for path planning), the gray value of all pixel points in the pixel block is set to a second value such as 255; otherwise, it is determined that the pixel block is not feasible, and the gray value of each pixel point is set to a first value such as 0. The grid map obtained by binarization is as shown in FIG. 4. In FIG. 4, the gray value of the white point is 255, and the gray value of the black point is 0.

Please note that, in the present embodiment, the resolution of the grid map corresponds to the length and width of a grid in the grid map. In other words, if the resolution is X cm, each grid in the map has a length of X cm and a width of X cm. The diameter of the chassis of a robot is typically several times the resolution of map, so many places in the map are unreachable to the robot. In other words, a too high resolution of the map will only cause waste of storage resources and affect path planning efficiency. In this regard, in the present embodiment, the diameter range of the robot is taken into consideration (a size of the area of the pixel block for division can be adjusted according to the diameter range), the grid map is divided using the pixel block and binarized, thereby reducing the map resolution, avoiding space waste, improving path planning efficiency and ensuring the effect of path planning.

Step 2: Map Optimization Based on Topological Points

When the grid map is used for robot positioning and navigation, it is necessary to traverse the pixel points every time the path is planned. When the area of the map is large, the operation efficiency is very low. In the present embodiment, it is optimized by deploying topological points in the grid map and storing the topological points.

In order to ensure the accuracy of search, topological points must be deployed in the determined search area. In the present embodiment, reference points are determined first by using pixel points in the search area, and topological points are deployed on the processed grid map according to the reference points determined. For example, pixel points, edge points or corner points in the search area are classified, and points of a same class are used as reference points; a centroid of an area constituted of the reference points is calculated, and topological points are deployed at positions of centroids on the processed grid map.

In other words, the positions where the topological point are deployed can be determined based on any of the three ways. Namely, pixel points, edge points or corner points in the search area are respectively classified, then the reference points are determined based on the points of a same class after classifying, a centroid of an area constituted of the reference points is calculated, and topological points are deployed at positions of centroids.

It can be understood that in some scenarios, any two or all of the three ways may be used at the same time in the deployment of topological points on the same grid map.

The three ways of determining the positions where the topological point are deployed are as follows.

The pixel points in the search area are classified. Specifically, pixel points are classified according to the distance and visible information between any two pixel points, if the visible information between the two pixel points indicates that there is no obstacle between the two pixel points and the distance between the two pixel points is less than or equal to a distance threshold, the two pixel points are classified as a same class, and points of a same class are obtained.

Alternatively, the edge points in the search area are classified. Specifically, edge points are classified according to the distance and visible information between any two edge points, if the visible information between the two edge points indicates that there is no obstacle between the two edge points and the distance between the two edge points is less than or equal to a distance threshold, the two edge points are classified as a same class, and points of a same class are obtained. The edge points refer to pixel points of the search area whose positions are adjacent to pixel points of a non-search area on the grid map.

Alternatively, the corner points in the search area are classified. Specifically, corner points are detected in the search area and corner points are classified according to the distance and visible information between any two corner points, if the visible information between the two corner points indicates that there is no obstacle between the two corner points and the distance between the two corner points is less than or equal to a distance threshold, the two corner points are classified as a same class, and points of a same class are obtained.

The corner point is a pixel point on the map with a drastic change in edge direction, and can represent the characteristics of the map. Therefore, the corner point is taken herein as an example to explain the implementation process of the topological point deployment. Edge points and corner points are both obtained by further selection of the pixel points in the search area. Compared with directly processing all the pixel points in the search area, these two ways (i,e., using edge points and corner points) further reduce the amount of data processing and improve the planning efficiency.

Turning to FIG. 2, the step of map optimization based on topological points comprises four sub-steps: corner point detection→corner point classifying→topological point deployment→and topological map construction.

Figure 5:
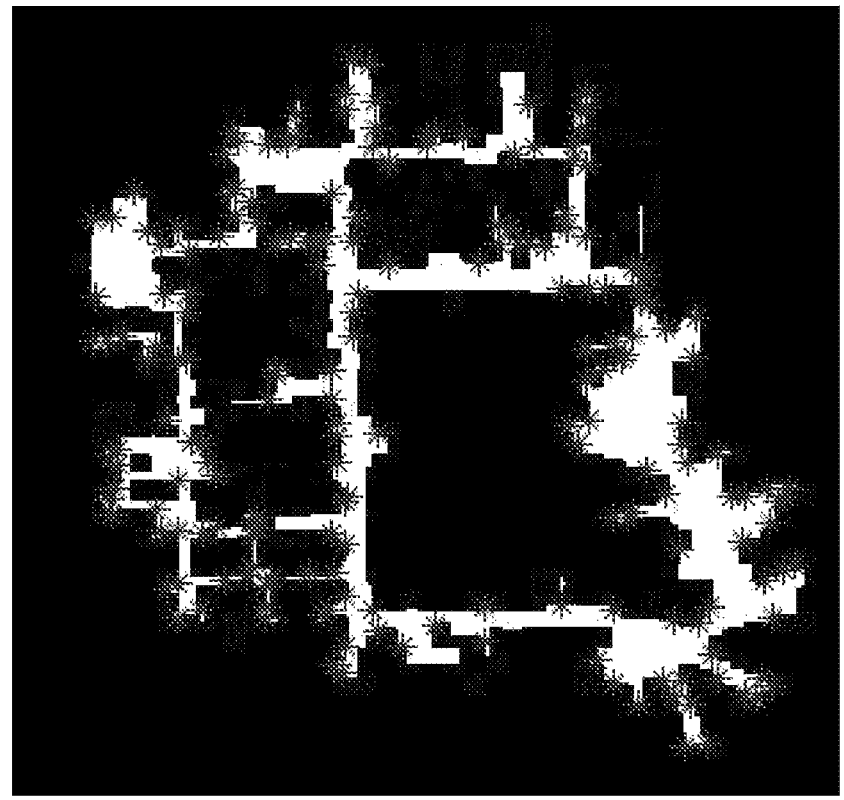
FIG. 5 is a schematic diagram of the detection of corner points on a grid map.

1) Corner Point Detection. Herein, by performing Harris corner detection on the map, the positions on the map with a drastic change in edge direction are obtained so as to deploy topology points. Referring to FIG. 5, the asterisk (*) in FIG. 5 is an illustration of the corner point detected.

2) Corner Point Classifying. Corner points are classified according to the distance and visible information between any two corner points, if the visible information between the two corner points indicates that there is no obstacle between the two corner points and the distance between the two corner points is less than or equal to a distance threshold, the two corner points are classified as a same class. In other words, corner points are classified according to the distance and visibility between corner points so as to reduce the number of topological points to be deployed and further improve path planning efficiency. If two corner points are visible (i.e., there is no obstacle between the two corner points) and within the range of the distance threshold (the straight line distance between the two corner points), the two corner points are considered to be of the same class.

3) Topological Point Deployment. For each class of corner point, deploy a topological point on its centroid and add it to the topological point list A. The calculation formula of the centroid is $$x = \frac{1}{n}\sum_{i=1}^{n} x_i \text{ and } y = \frac{1}{n}\sum_{i=1}^{n} y_i,$$

where the value range of i is 1 to n, n is the total number of corner points of a class, and $x_i$ and $y_i$ are the coordinate values of the corner points.

If a corner point has not a corner point of the same class, the nearest edge point is taken as the position where the topology point is deployed.

4) Topological Map Construction. The shortest distance of any topological point is calculated using the A* algorithm and stored it in the linked list, and the adjacency information of any two topological points is determined. Here, if the shortest distance between two topological points is directly the distance between the two points (it can be understood that the two nodes are directly connected in the map) and does not pass other topological points, the two topological points are considered as adjacent nodes. It can be represented by $t_{ij}$, i, j respectively represent a topological point, $t_{ij}=1$ indicates adjacent, and $t_{ij}=0$ indicates non-adjacent.

The A* algorithm can be used to search for the shortest path. The A*(A-Star) algorithm is the most effective direct search method for solving the shortest path in a static road network, and is also an effective algorithm for solving many search problems. A* introduced heuristic search on the basis of Dijkstra to solve the search problems, and greatly improved the efficiency of search while ensuring the optimal solution. It has been popular till now due to its simplicity and easy implementation.

By extracting and classifying corner points and then generating topological points, the scale of the topological map is significantly reduced. After the topological map is constructed, Step 3 is performed.

Step 3: Shortest Path Calculation Based on the Topological Map

Turning to FIG. 2, Step 3 comprises four sub-steps: setting the target point→calculating an optimal path from the starting point to the nearest topological point→calculating an optimal path from the target point to the nearest topological point→generating an optimal path.

Specifically, in Step 3, the calculation of the optimal path from the starting point to the target point is performed as follows:

(3.1) Setting the Target Point. In order to improve path planning efficiency, in the present embodiment, the planning scale of the path to be generated is roughly judged. In other words, it is judged whether there are obstacles on the straight connection line of two points by simply searching along the starting point to the target point. If an obstacle is encountered, the path planning is considered to be a large-scale path planning, and the process proceeds to sub-step (3.2). Otherwise, it is considered that the path planning is a small-scale path planning, now the pixel points that are passed are recorded as the shortest path, and the result is outputted directly.

(3.2) Calculating the Distance from the Starting Point to the Nearest Topological Point. The topology point list A is traversed, the topological point a nearest to the starting point is calculated, and the shortest path from the starting point to the nearest topological point a is calculated using the A* algorithm, which is recorded as bath1.

(3.3) Calculating the Distance from the Target Point to the Nearest Topological Point. The topology point list A is traversed, the topological point b nearest to the target point is calculated using the A* algorithm, and the shortest path from the target point to the nearest topological point b is calculated, which is recorded as bath2.

(3.4) Generating an Optimal Path. The linked list is traversed to look up the shortest distance, bath_ab, from the topological point a to the topological point b. Then the optimal path is bath1+bath_ab+bath2.

Figure 6:
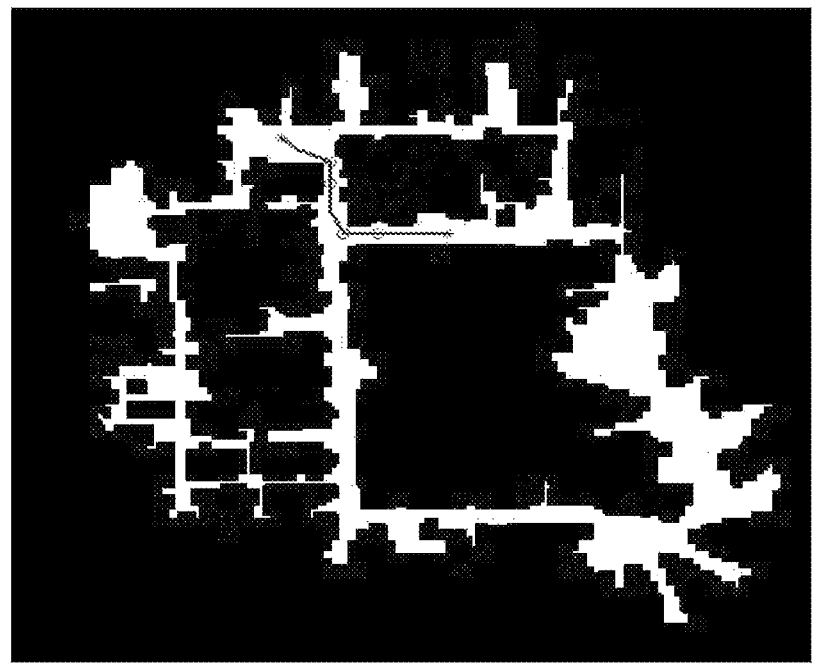
FIG. 6 is a schematic diagram of an optimal path planned according to an embodiment of the present disclosure.

The line in the white area as shown in FIG. 6 is the optimal path from the starting point to the target point planned in the present embodiment.

In sum, the present disclosure divides the grid map into grids using pixel blocks, thereby effectively reducing the scale of the map. By detecting corner points and deploying corresponding topological points to construct the network topological map, the shortest path between nodes is saved, and the path planning efficiency for large-scale maps is greatly improved.

Figure 7:
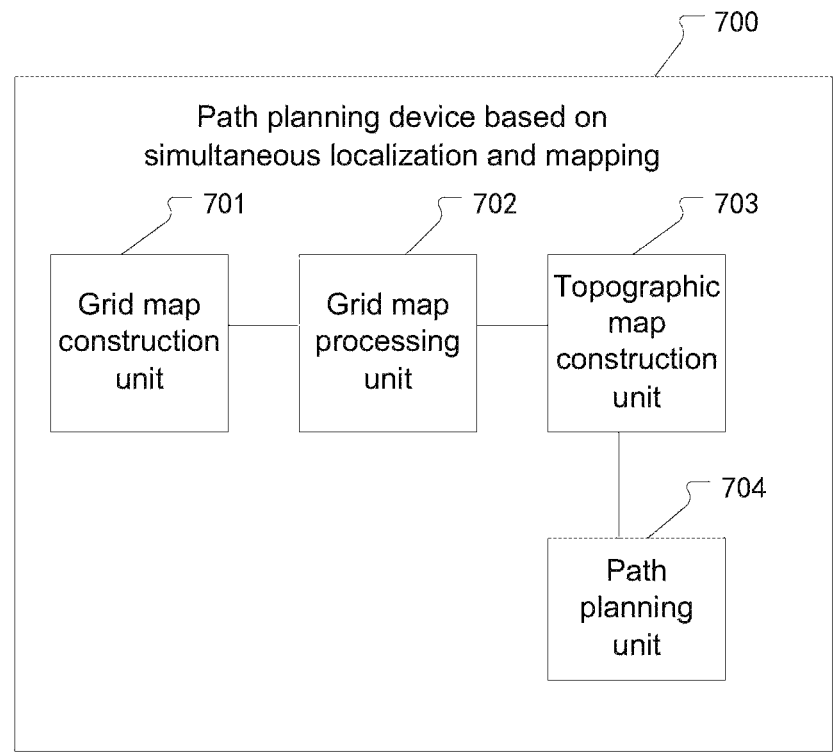
FIG. 7 is a block diagram of a path planning device based on simultaneous localization and mapping according to an embodiment of the present disclosure.

The present disclosure further provides a path planning device based on simultaneous localization and mapping. FIG. 7 is a block diagram of a path planning device based on simultaneous localization and mapping according to an embodiment of the present disclosure. Referring to FIG. 7, the path planning device 700 based on simultaneous localization and mapping of the present embodiment comprises:

a grid map construction unit 701, for collecting environmental information in a viewing angle by a sensor of a mobile device, processing the environmental information by using an SLAM algorithm, and constructing a grid map;

a grid map processing unit 702, for dividing the grid map to obtain a plurality of pixel blocks, using an area constituted of pixel blocks not occupied by obstacles as a search area for path planning, and obtaining a processed grid map;

a topographic map construction unit 703, for determining reference points by using pixel points in the search area, deploying topological points on the processed grid map according to the reference points determined, and constructing a topological map; and a path planning unit 704, for calculating an optimal path from a starting point to a preset target point by using a predetermined algorithm according to the topological map constructed.

In an embodiment of the present disclosure, the path planning unit 704 is specifically for, calculating a shortest distance between any two topological points by using a predetermined algorithm, determining adjacency information of any two topological points, storing the shortest distance information between any two topological points in a linked list; calculating a shortest distance between the starting point and a topological point nearest to the starting point as a first distance; calculating a shortest distance between the target point and a topological point nearest to the target point as a second distance; looking up the linked list to obtain a shortest distance between the topological point nearest to the starting point and the topological point nearest to the target point as a third distance, and obtaining an optimal path from the starting point to the target point by summing the first distance, the second distance, and the third distance.

The topological map construction unit 703 is specifically for classifying pixel points, edge points or corner points in the search area, and determining points of a same class as reference points; and calculating a centroid of an area constituted of the reference points, and deploying topological points at positions of centroids on the processed grid map.

In an embodiment of the present disclosure, the grid map processing unit 702 is specifically for dividing the grid map to obtain a plurality of pixel blocks by using multiple block areas equal in area; and judging whether a pixel block is occupied by an obstacle, if yes, setting a gray value of pixel points in the pixel block to a first value, and if no, setting a gray value of pixel points in the pixel block to a second value.

In an embodiment of the present disclosure, the grid map processing unit 702 is specifically for judging, for each pixel block, whether a central pixel point of the pixel block is occupied by an obstacle; if the central pixel point is occupied, determining that the pixel block is occupied by an obstacle, and judging next pixel block until all the pixel blocks are traversed; and if the central pixel point is not occupied by an obstacle, sequentially traversing other pixels points in the pixel block, and if none of other pixels point is occupied by an obstacle, determining that the pixel block is not occupied by an obstacle.

In an embodiment of the present disclosure, the topological map construction unit 703 is specifically for, classifying pixel points in the search area, specifically, classifying pixel points according to the distance and visible information between any two pixel points, if the visible information between the two pixel points indicating that there is no obstacle between the two pixel points and the distance between the two pixel points is less than or equal to a distance threshold, classifying the two pixel points as a same class and obtaining points of a same class; alternatively, classifying edge points in the search area, specifically, classifying edge points according to the distance and visible information between any two edge points, if the visible information between the two edge points indicating that there is no obstacle between the two edge points and the distance between the two edge points is less than or equal to a distance threshold, classifying the two edge points as a same class and obtaining points of a same class, wherein the edge points refer to pixel points of the search area whose positions are adjacent to pixel points of a non-search area on the grid map; alternatively, classifying corner points in the search area, specifically, detecting corner points in the search area, classifying corner points according to the distance and visible information between any two corner points, if the visible information between the two corner points indicating that there is no obstacle between the two corner points and the distance between the two corner points is less than or equal to a distance threshold, classifying the two corner points as a same class and obtaining points of a same class.

In an embodiment of the present disclosure, the grid map processing unit 702 is specifically for dividing the grid map by using the block area according to a dividing sequence, and when an area to be divided on the grid map has an area less than the area of the block area, obtaining a divided block area after filling an insufficient portion with a first value.

It should be noted that the exemplary illustration of the functions performed by the units in the device shown in FIG. 7 may refer to the related contents of the exemplary illustration in the foregoing method embodiments, and will not be repeated herein.

Figure 8:
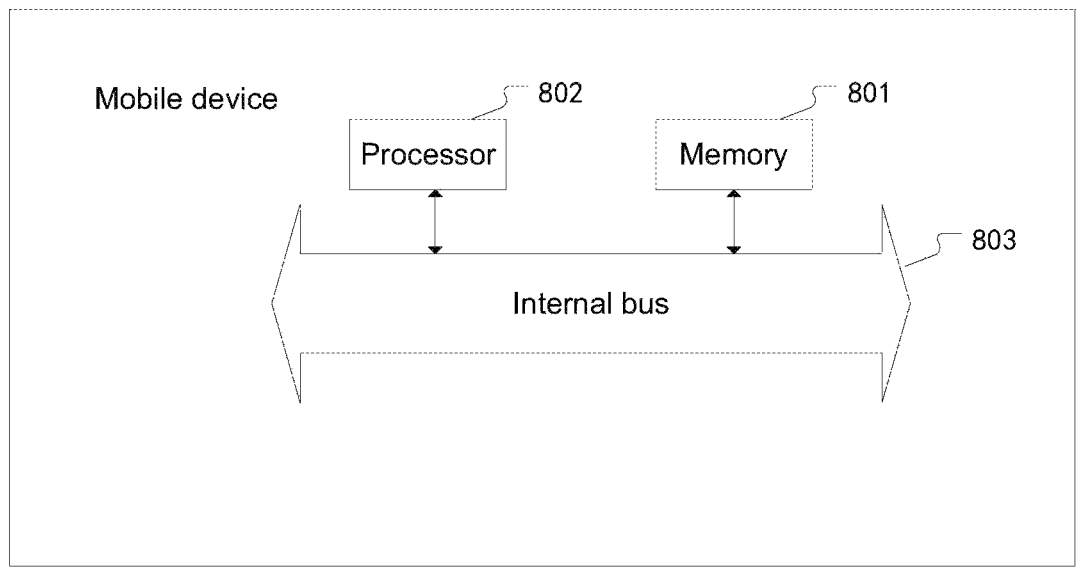
FIG. 8 is a schematic structural diagram of a mobile device according to an embodiment of the present disclosure.

In addition, the present disclosure further provides a mobile device. FIG. 8 is a schematic structural diagram of a mobile device according to an embodiment of the present disclosure. As shown in FIG. 8, the mobile device comprises a memory 801 and a processor 802. The memory 801 and the processor 802 are communicatively connected by an internal bus 803. The memory 801 stores program instructions that can be executed by the processor 802. When the program instructions are executed by the processor 802, the foregoing path planning method based on simultaneous localization and mapping can be implemented.

The mobile device herein is, for example, an automated guided vehicle (AGV), a drone, an intelligent robot or a head mounted device.

In addition, the logic instructions in the memory 801 described above may be stored in a computer-readable storage medium when being implemented in the form of a software functional module and sold and used as an independent product. Based on such an understanding, the substance or the part that contributes to the prior art of the technical solutions of the present disclosure, or a part of the technical solutions, may be embodied in the form of a software product. The computer software product may be stored in a storage medium, and include several instructions for causing a computer device (which may be a personal computer, a server, or a network device) to fully or partially perform the method described in the various embodiments of the present disclosure. The storage medium includes various mediums capable of storing program codes, such as a U disk, a mobile hard disk, a read-only memory (ROM), a random access memory (RAM), a magnetic disk, or an optical disk.

Another embodiment of the present disclosure provides a computer readable storage medium storing computer instructions that cause the computer to perform the path planning method based on simultaneous localization and mapping described above.

As will be appreciated by a person skilled in the art, the embodiments of the present disclosure may be embodied as a system, method or computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to magnetic storage media, CD-ROMs and optical storage media) having computer-usable program codes recorded thereon.

The present disclosure is described with reference to flowchart illustrations and/or block diagrams of methods, apparatus (systems) and computer program products according to embodiments of the present disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processing apparatus, or other programmable data processing apparatus to produce a machine, such that the instructions, which execute via the processor of the computer or other programmable data processing apparatus, create means for implementing the functions specified in the flowchart and/or block diagram block or blocks.

It should be noted that the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the sentence "comprising a . . . " does not exclude the case that there are other same elements in the process, method, article or apparatus including the element.

The above merely describes particular embodiments of the present disclosure. By the teaching of the present disclosure, a person skilled in the art can make other modifications or variations based on the above embodiments. A person skilled in the art should understand that, the detailed description above is only for the purpose of better explaining the present disclosure, and the protection scope of the present disclosure should be subject to the protection scope of the claims.

What is claimed is:

1. A path planning method based on simultaneous localization and mapping, comprising:

collecting environmental information within a viewing angle by a sensor of a mobile device, processing the environmental information by using a simultaneous localization and mapping (SLAM) algorithm, and constructing a grid map;

dividing the grid map into a plurality of pixel blocks, binarizing the grid map thereby distinguishing pixel blocks occupied by an obstacle from pixel blocks not occupied by an obstacle, and using an area constituted of the pixel blocks not occupied by obstacles as a search area, thereby obtaining a processed grid map;

classifying pixel points, edge points or corner points in the search area, and determining points of a same class as reference points, calculating a centroid of an area constituted of the reference points, and constructing a topological map by deploying topological points at positions of centroids on the processed grid map; and calculating a path from a starting point to a preset target point by using a predetermined algorithm according to the constructed topological map;

wherein classifying pixel points, edge points or corner points in the search area comprises:

classifying the pixel points in the search area, wherein classifying the pixel points in the search area further comprises: classifying the pixel points according to a distance and visible information between any two pixel points, and when the visible information between the two pixel points indicates that there is no obstacle between the two pixel points and the distance between the two pixel points is less than or equal to a distance threshold, classifying the two pixel points as a same class and obtaining points of a same class;

classifying the edge points in the search area, wherein classifying the edge points in the search area further comprises: classifying the edge points according to a distance and visible information between any two edge points, and when the visible information between the two edge points indicates that there is no obstacle between the two edge points and the distance between the two edge points is less than or equal to a distance threshold, classifying the two edge points as a same class and obtaining points of a same class, wherein the edge points refer to pixel points of the search area whose positions are adjacent to pixel points of a non-search area on the grid map; and classifying the corner points in the search area, wherein classifying the corner points in the search area further comprises:

detecting the corner points in the search area, classifying the corner points according to a distance and visible information between any two corner points;

when the visible information between the two corner points indicates that there is no obstacle between the two corner points and the distance between the two corner points is less than or equal to a distance threshold, classifying the two corner points as a same class and obtaining points of a same class; and when a corner point has not a corner point of a same class, taking its nearest edge point as a position of deploying topology points.

2. The method according to claim 1, wherein the step of calculating the path from the starting point to the preset target point by using the predetermined algorithm according to the constructed topological map further comprises:

calculating a shortest distance between any two topological points by using a predetermined algorithm, determining adjacency information of any two topological points, and storing the shortest distance information between any two topological points in a linked list;

calculating a shortest distance between the starting point and a topological point nearest to the starting point as a first distance;

calculating a shortest distance between the preset target point and a topological point nearest to the preset target point as a second distance;

looking up the linked list, thereby obtaining a shortest distance between the topological point nearest to the starting point and the topological point nearest to the preset target point as a third distance, and obtaining the path from the starting point to the preset target point by summing the first distance, the second distance, and the third distance.

3. The method according to claim 1, wherein the step of dividing the grid map into the plurality of pixel blocks, binarizing the grid map thereby distinguishing pixel blocks occupied by an obstacle from pixel blocks not occupied by an obstacle, and using the area constituted of pixel blocks not occupied by obstacles as the search area further comprises:

dividing a grid map into a plurality of pixel blocks by using multiple block areas equal in area;

judging whether a pixel block is occupied by an obstacle, setting a gray value of pixel points in a pixel block occupied by the obstacle to a first value, and setting the gray value of pixel points in the pixel block not occupied by obstacles to a second value.

4. The method according to claim 3, wherein the step of judging whether a pixel block is occupied by an obstacle further comprises:

judging whether a central pixel point of a pixel block is occupied by the obstacle in each pixel block of a plurality of pixel blocks;

when the central pixel point is occupied, determining that a pixel block is occupied by the obstacle, and judging a next pixel block; and when the central pixel point is not occupied by the obstacle, analyzing other pixel points in a pixel block, and if one of other pixel points in a pixel block is occupied by the obstacle, determining that the pixel block is occupied by the obstacle.

5. The method according to claim 3, wherein the step of dividing a grid map into a plurality of pixel blocks by using multiple block areas equal in area further comprises:

dividing a grid map by using a block area according to a dividing sequence, and then taking pixels that have not been divided into pixel blocks as a pixel block and setting pixels that have not been divided into pixel blocks to a first value.

6. A path planning device based on simultaneous localization and mapping, comprising:

a memory storing a computer program; and a processor executing the computer program;

wherein the processor is configured for:

collecting environmental information within a viewing angle by a sensor of a mobile device, processing the environmental information by using a simultaneous localization and mapping (SLAM) algorithm, and constructing a grid map;

dividing the grid map into a plurality of pixel blocks, binarizing the grid map, thereby distinguishing pixel blocks occupied by an obstacle from pixel blocks not occupied by an obstacle, and using an area constituted of pixel blocks not occupied by obstacles as a search area, thereby obtaining a processed grid map;

classifying pixel points, edge points or corner points in the search area, and determining points of a same class as reference point, and calculating a centroid of an area constituted of the reference points, and deploying topological points at positions of centroids on the processed grid map thereby constructing a topological map; and calculating a path from a starting point to a preset target point by using a predetermined algorithm according to the constructed topological map;

wherein classifying pixel points, edge points or corner points in the search area comprises:

classifying the pixel points in the search area, wherein classifying the pixel points in the search area further comprises: classifying the pixel points according to a distance and visible information between any two pixel points, and when the visible information between the two pixel points indicates that there is no obstacle between the two pixel points and the distance between the two pixel points is less than or equal to a distance threshold, classifying the two pixel points as a same class and obtaining points of a same class;

classifying the edge points in the search area, wherein classifying the edge points in the search area further comprises: classifying the edge points according to a distance and visible information between any two edge points, and when the visible information between the two edge points indicates that there is no obstacle between the two edge points and the distance between the two edge points is less than or equal to a distance threshold, classifying the two edge points as a same class and obtaining points of a same class, wherein the edge points refer to pixel points of the search area whose positions are adjacent to pixel points of a non-search area on the grid map; and classifying the corner points in the search area, wherein classifying the corner points in the search area further comprises:

detecting the corner points in the search area, classifying the corner points according to a distance and visible information between any two corner points;

when the visible information between the two corner points indicates that there is no obstacle between the two corner points and the distance between the two corner points is less than or equal to a distance threshold, classifying the two corner points as a same class and obtaining points of a same class; and when a corner point has not a corner point of a same class, taking its nearest edge point as a position of deploying topology points.

7. The device according to claim 6, wherein the processor is configured for:

calculating a shortest distance between any two topological points by using a predetermined algorithm, determining adjacency information of any two topological points, storing the shortest distance information between any two topological points in a linked list;

calculating a shortest distance between the starting point and a topological point nearest to the starting point as a first distance;

calculating a shortest distance between the preset target point and a topological point nearest to the preset target point as a second distance;

looking up the linked list and identifying a shortest distance between the topological point nearest to the starting point and the topological point nearest to the preset target point as a third distance, and obtaining the path from the starting point to the preset target point by summing the first distance, the second distance, and the third distance.

8. The device according to claim 6, wherein the processor is configured for:

dividing a grid map into a plurality of pixel blocks by using multiple block areas equal in area; and judging whether a pixel block is occupied by an obstacle, setting a gray value of pixel points in the pixel block occupied by the obstacle to a first value, and setting the gray value of pixel points in the pixel block not occupied by obstacles to a second value.

9. The device according to claim 8, wherein the processor judging whether a pixel block is occupied by an obstacle further comprises:

judging whether a central pixel point of a pixel block is occupied by the obstacle in each pixel block;

when the central pixel point is occupied, determining that a pixel block is occupied by the obstacle, and judging a next pixel block; and when the central pixel point is not occupied by the obstacle, analyzing other pixel points in a pixel block, and when one of other pixel points is not occupied by the obstacle, determining that the pixel block is occupied by the obstacle.

10. The device according to claim 6, wherein the processor is configured for:

dividing a grid map by using a block area according to a dividing sequence, and then taking pixels that have not been divided into pixel blocks as a pixel block and setting pixels in a pixel block other than pixels that have not been divided into pixel blocks to a first value.

* * * * *